United States Patent [19]

Meismer

[11] 4,372,156
[45] Feb. 8, 1983

[54] METHOD AND APPARATUS FOR DETERMINING CYLINDER LINER PROJECTION

[75] Inventor: Richard A. Meismer, Metamora, Ill.

[73] Assignee: Caterpillar Tractor Co., Peoria, Ill.

[21] Appl. No.: 235,214

[22] Filed: Feb. 17, 1981

[51] Int. Cl.³ .................. G01M 15/00; F02F 1/10; B23P 19/02; B23P 15/00
[52] U.S. Cl. ................. 73/119 R; 123/41.84; 29/156.4 WL; 29/251; 29/255
[58] Field of Search .................. 73/119 R; 123/41.84, 123/193 CH; 29/251, 256, 255, 263, 265, 156 WL

[56] References Cited

U.S. PATENT DOCUMENTS

| | | | |
|---|---|---|---|
| 1,301,254 | 3/1919 | Gunn et al. | 123/41.84 |
| 2,341,677 | 2/1944 | Wass | 29/265 |
| 2,421,324 | 5/1947 | Graham | 29/256 X |
| 3,396,711 | 8/1968 | Fangman | 123/193 CH |

FOREIGN PATENT DOCUMENTS

| | | | |
|---|---|---|---|
| 865553 | 4/1952 | Fed. Rep. of Germany | 29/256 |
| 2158483 | 5/1973 | Fed. Rep. of Germany | 29/156 WL |
| 198745 | 6/1967 | U.S.S.R. | 73/119 |

OTHER PUBLICATIONS

Diesel Power, Nov. 1954, pp. 55–57, Proper Techniques to Avoid Liner Troubles, by Smith with White Machine Works.
Modern Diesel Engine Practice, by Orville Adams 1931, pp. 374–375, published by Norman W. Henley of New York.
Modern Oil Engine Practice, by Edward Molloy, 3rd Ed. 1947, pp. 552–553, published by George Newnes Ltd., London, Eng.
Diesel Operation and Maintenance, by Orville Adams, 1946, pp. 186–187, published by Prentice-Hall, New York.
Glenn's Foreign Car Repair Manual, by Harold Glenn, 1963, p. 208, published by Chilton Co., Philadelphia, Li of Lens, 63-8205.

*Primary Examiner*—Charles A. Ruehl
*Assistant Examiner*—David V. Carlson
*Attorney, Agent, or Firm*—Wegner, Stellman, McCord, Wood & Dalton

[57] ABSTRACT

A method of determining the projection of the upper end (15) of a cylinder liner (14) above the top surface (13) of a cylinder block structure (10). The cylinder liner (14) is caused to be fully inserted into the cylinder bore (11) by a press ring (32) acting on the upper end of the cylinder liner concurrently with the measurement of its position. The press ring is resiliently forced against the top surface (37) of the cylinder liner by a plurality of pressure springs (35) and a pressure plate (25). The pressure plate is urged into engagement with the cylinder block structure top surface (13) by a holddown bar (26). The measuring system utilizes a gage indicator (20) having a probe which is selectively engaged with the upper surface of the cylinder liner adjacent positions of force transfer between the press ring and cylinder liner. The probe is caused to determine the position of the cylinder block structure upper surface (13) selectively directly or indirectly. In effecting a direct determination, the probe is inserted through a zeroing hole in the pressure plate to determine the disposition of the lower surface of the pressure plate. In the direct method, the probe is brought into direct engagement with the cylinder block structure upper surface (13) as through recesses in the periphery of the pressure plate.

21 Claims, 5 Drawing Figures

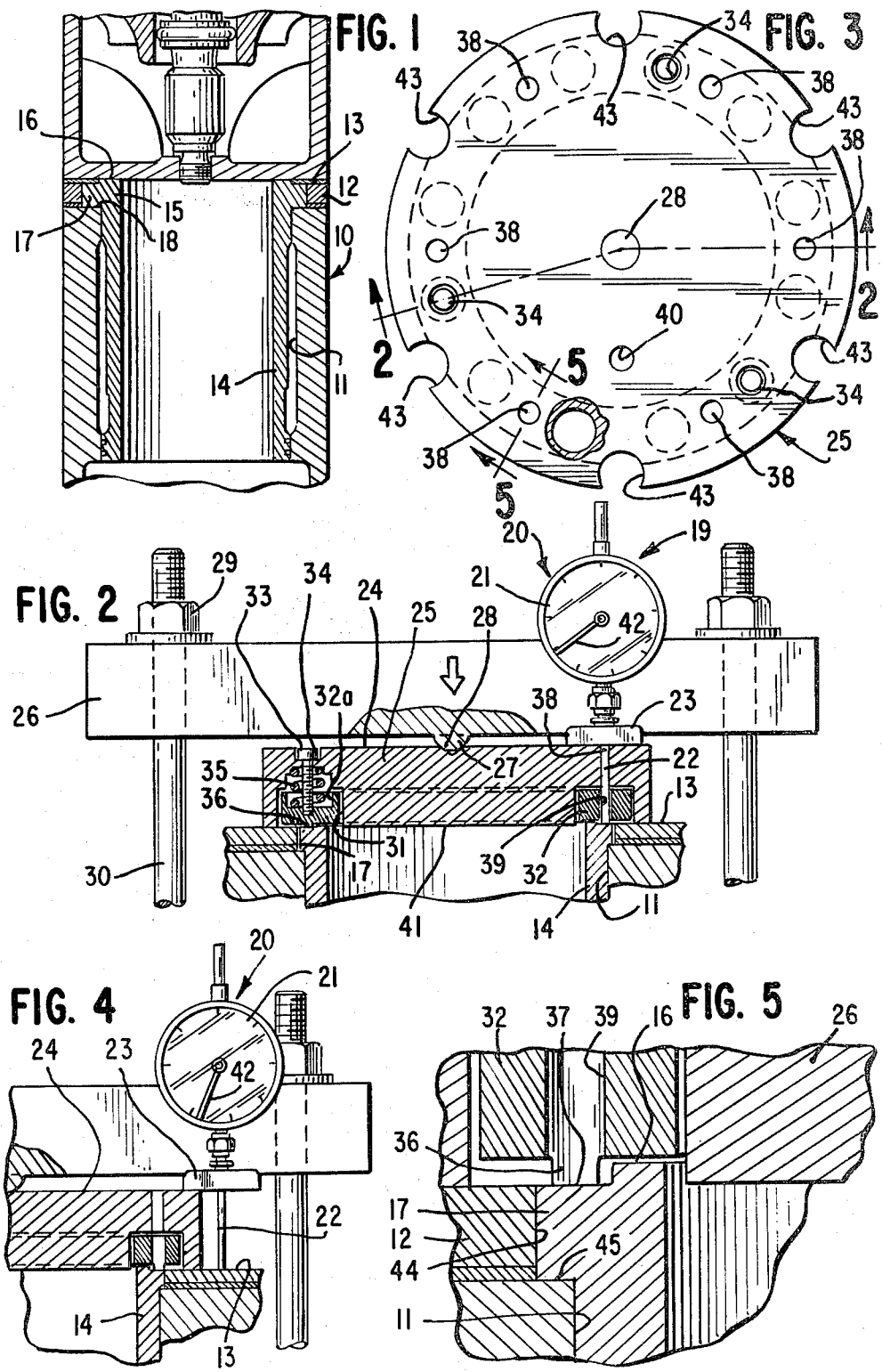

METHOD AND APPARATUS FOR DETERMINING CYLINDER LINER PROJECTION

DESCRIPTION

1. Technical Field

This invention relates to the servicing of internal combustion engines and in particular to the maintenance and rebuilding of such engines utilizing cylinder liners.

2. Background Art

In one form of internal combustion engine, the cylinder is provided with a liner which projects slightly above the top of the cylinder block. The cylinder block may include a spacer plate, or deck, as the top portion thereof.

It is conventional to provide on the cylinder liner a flange which seats against a shoulder on the cylinder block when the liner is fully inserted. The flange includes an upwardly projecting portion which extends to slightly above the upper surface of the block to be spaced ajacent the cylinder head in the assembled arrangement of the engine as illustrated in U.S. Pat. No. 3,396,711, of Charles N. Fangman et al, which patent is owned by the assignee hereof. As further shown in the Fangman et al patent, a sealing gasket is interposed between the cylinder head and the flange, as well as the top surface of the block which may constitute the top surface of the spacer plate, or deck, where used.

A cylinder liner flange is further illustrated in U.S. Pat. No. 1,301,254 of Earl G. Gunn et al.

It is desirable that the flange of the cylinder inder liner extend above the plane of the top surface of the cylinder block and be maintained within prescribed limits which will vary on different engines. However, it is most important that the projection be substantially the same for all cylinder liners of a given engine. It is coventional to require that the projection variation be no greater than 0.001".

A number of measuring systems have been developed for assuring the proper projection of the respective cylinder liners. The systems of the prior art have had the serious disadvantages of complexity and relatively high cost. The systems have been relatively difficult to utilize and to utilize with a desired high degree of accuracy, particularly in the use thereof in maintenance and rebuilding surfacing operations.

DISCLOSURE OF INVENTION

The present invention comprehends an improved method of determining the projection of the upper end of a cylinder liner above the top of a cylinder block which is extremely simple and economical while yet providing high accuracy and ease of use. Thus, the present invention is adapted for use in the servicing of internal combustion engines, such as in maintenance and rebuilding thereof.

The method of determining the projection of the present invention includes the step of determining with a gauge indicator the position of the cylinder liner end while the cylinder liner is being concurrently forcibly urged to the fully installed disposition in the cylinder block structure.

In the illustrated invention, the gauge indicator includes a probe which extends through the force transfer means applying the urging force to the cylinder liner.

The force transfer means, in the illustrated embodiment, comprises a press ring which is carried by a pressure plate.

The press ring may be resiliently mounted to the pressure plate so as to provide a preselected maximum urging force to the cylinder liner.

The gauge indicator is further caused to determine the disposition of the upper surface of the cylinder block structure from which the cylinder liner end projects. In the illustrated embodiment, the cylinder liner structure includes a top deck, the upper surface of which defines the upper surface of the cylinder block structure. Thus, the gauge indicator is caused to sense the disposition of the top surface of the deck for comparison with the determined disposition of the upper end of the cylinder liner projected from the cylinder block structure in providing the desired indication of the extension of the cylinder liner end above the cylinder block structure upper surface.

In one form of the invention, the determination of the disposition of the upper surface of the cylinder block structure is effected by determining a gauge indicator reading corresponding to the bottom surface of the pressure plate which is seated against the upper surface of the cylinder block structure when the determination of the disposition of the cylinder liner end is made with the gauge indicator. Thusly, the disposition of the upper surface of the cylinder block structure is indirectly accurately determined by the determination of the disposition of the lower surface of the pressure plate.

The upper surface of the pressure plate is caused to be accurately flat. The gauge indicator is provided with a base which is seated on the flat upper surface of the pressure plate and making the gauge indicator readings. Thus, the present invention eliminates the need for mounting the gauge indicator on portions of the cylinder block structure which may result in inaccurate, nonplanar dispositions of the gauge indicator when moved to different portions of the cylinder block structure.

In one conventional form, the cylinder liner end defines a radially outwardly turned flange. The press ring, in the illustrated embodiment includes a depending annular flange engaging the upper surface of the cylinder liner flange. In the illustrated embodiment, the press ring is provided with a plurality of openings through which the gauge indicator probe is inserted for providing a number of readings of the disposition of the cylinder liner upper end at annularly spaced positions on the outturned flange thereof. The openings may extend through the depending flange whereby the determination of the disposition of the cylinder liner upper end is made adjacent the areas of force transfer between the press ring and the cylinder liner to provide high accuracy in the readings.

The press ring may be movably associated with the pressure plate by suitable means for facilitated use of the structure in carrying out the surfacing operations.

In broad aspect, the invention comprehends the provision of measuring apparatus for determining the projection of the cylinder liner end above the upper surface of the engine block structure, including a pressure plate, a gauge indicator, a force transfer means, and means for selectively passing the probe into engagement with the cylinder liner and to a position flush with the bottom of the pressure plate and/or the upper surface of the cylinder block structure.

By providing a pressure plate having an annular engagement with the upper surface of the cylinder block structure, unevenness of the cylinder block structure surface is averaged out and, thus, a more accurate reading is obtained.

Thus, the present invention comprehends an improved method and apparatus for determining cylinder liner projection, such as in servicing internal combustion engines, which is extremely simple and economical while yet providing high accuracy and facility in such servicing.

BRIEF DESCRIPTION OF THE DRAWING

FIG. 1 is a fragmentary diametric section of a portion of an internal combustion engine utilizing a cylinder liner projecting to slightly above the upper surface of the cylinder block structure spacer plate;

FIG. 2 is a fragmentary vertical section illustrating the arrangement of the measuring apparatus in determining the disposition of the upper end of the cylinder liner;

FIG. 3 is a top plan view of the pressure ring of the measuring apparatus;

FIG. 4 is a fragmentary vertical section illustrating one arrangement of the measuring apparatus in determining the disposition of the upper surface of the cylinder block structure; and FIG. 5 is a fragmentary enlarged vertical section taken substantially along the line 5—5 of FIG. 3.

BEST MODE FOR CARRYING OUT THE INVENTION

In the exemplary embodiment of the invention as disclosed in the drawing, a cylinder block structure generally designated 10 is provided with a plurality of cylinder bores 11. In the illustrated embodiment, the top portion of the cylinder block is defined by a spacer plate, or deck, 12, it being understood that the top portion of the block may be integral as in the above-indicated E. G. Gunn et al U.S. Pat. No. 1,301,254. The upper end of the cylinder block structure is defined by an upper surface 13. A cylinder liner 14 is installed in the bore 11 and defines an upper portion 15 which projects slightly above the upper surface 13 to define an upper end surface 16 thereof.

As further shown in FIG. 1, the upper end of the cylinder liner defines an annular outturned flange 17 which seats on a shoulder 18 of the cylinder block bore 11 when the liner is fully inserted in the cylinder block bore. Adjustment of the disposition of the cylinder liner in the bore may be effected by providing suitable shims between flange 17 and shoulder 18, as desired. The need for such shims is determined by the measurement of the vertical spacing of upper surface 16 of the cylinder liner relative to the upper surface 13 of the cylinder block structure. The present invention is concerned with an improved method of determining such vertical spacing advantageously adapted for use as in servicing of the engine.

Referring now more specifically to FIG. 2, the improved method of determining the cylinder liner projection is illustrated in conjunction with the use of a measuring system generally designated 19 having a gauge indicator 20 provided with a dial 21 for reading the disposition of a probe 22 thereof. The dial is carried on a base 23 which is adapted to have accurate surface engagement with the upper surface 24 of a pressure plate 25. The pressure plate is urged against the top surface 13 of deck 12 by a holddown bar 26 having a central projection 27 received in a suitable recess 28 in the upper surface 24 of pressure plate 25. Forceful urging of the holddown bar against the pressure plate may be effected by suitable clamping nuts 29 threaded to pulldown studs 30.

Pressure plate 25 defines a downwardly opening, coaxially annular recess 31 movably receiving a press ring 32. The press ring is movably retained in the recess by suitable bolts 33 extending downwardly through a plurality of stepped openings 34. The press ring is biased downwardly by a plurality of compression coil springs 35 coaxially associated one each with the bolts and extending between the pressure plate and the press ring, with the lower end of the spring being received in an upwardly opening recess 32a in the press ring.

Thus, as seen in FIG. 2, the press ring is resiliently urged downwardly from the recess by springs 35 with the bolt 33 maintaining the press ring in association with the pressure plate at all times.

Press ring 32 is provided with a coaxial depending annular flange 36 which, as shown in FIG. 5, is urged against the top surface 37 of flange 17 when the structure is in the measuring arrangement of FIG. 2.

Pressure plate 25 is provided with a plurality of annularly spaced, vertically extending probe passages 38, permitting the insertion of probe 22 of gauge indicator 20 downwardly therethrough. Press ring 32 is provided with a corresponding plurality of through probe passages 39 which are caused to be aligned with passages 38 by the retaining bolts 33. Probe passages 39 open downwardly through the press ring flange 36, as shown in FIG. 5 and, thus, the gauge indicator probe 22 may be inserted downwardly through each one of the aligned sets of openings 38, 39 to permit the probe to sense the level of the liner flange surface 37 at a plurality of annularly spaced positions about the axis of the liner. Thus, any irregularity or unevenness in the surface 37 is averaged out by the readings for improved indication of the surface 37 position.

As shown in FIG. 2, in determining the position of surface 37, base 23 of the dial indicator is facially engaged with top surface 24 of pressure plate 25. Surface 24 may be machined to be accurately flat so that the base 23 is accurately disposed in a single common plane in making each of the several determinations of the position of surface 37 through the respective different probe passages.

As seen in FIG. 5, press ring flange 36 defines the only portion of the press ring engaging the upper end of the cylinder liner. As the probe passages open through the flange 36, measurement of the location of surface 37 is made immediately adjacent the point of force transfer to the cylinder liner for further improved accuracy in the measurement operation.

The invention further comprehends the determination of the location of cylinder block surface 13 relative to surface 37 either directly or indirectly as desired. More specifically, as shown in FIG. 3, pressure plate 25 may be provided with a zeroing hole 40 extending through the pressure plate parallel to the axis thereof. Thus, prior to the installation of the pressure plate in the measuring arrangement of FIG. 2, the probe may be inserted through the zeroing hole 40 so as to bring the base 23 into engagement with the upper surface 24 of the plate. A flat metal strip may be extended across the opening 40 flush with the lower surface 41 of the pressure plate. Thus, with the probe sensing the location of the lower surface 41, the gauge 21 may be adjusted so as to zero the needle 42 thereof. Resultingly, when the measuring system 19 is arranged as shown in FIG. 2 with surface 41 of the pressure plate facially engaging upper surface 13 of cylinder block structure 10, the spacing of cylinder liner surface 37 upwardly of surface 13 is indicated as a direct readout on gauge 21. As discussed above, the accurate flat configuration of the pressure plate top surface 24 assures an accurate determination of the position of surface 37 when the base 23 is moved from the position on surface 24 overlying opening 40 to the positions on surface 24 overlying each of the gauge passages 38 in making the above discussed plurality of minor projection determinations.

The direct method of utilizing the gauge indicator 20 in determining the position of cylinder block structure surface 13 is illustrated in FIG. 4. As shown therein, base 23 of gauge indicator 20 is moved to the periphery of the top surface 24 so as to be aligned selectively with any one of a plurality of outwardly opening cylindrical recesses 43 in the pressure plate periphery. In this arrangement, the probe 22 extends downwardly from base 23 into direct contact with the cylinder block structure surface 13, as shown in FIG. 4, to provide the desired readout on dial 21.

INDUSTRIAL APPLICABILITY

Measuring system 19 of the present invention permits facilitated cylinder liner projection determination such as in the servicing of internal combustion engines as in maintenance and rebuilding thereof. Thus, the projection of the cylinder liner may be readily checked for bolt torqueing, gasket clearance, etc., purposes.

The measuring system apparatus of the present invention is extremely simple and economical of construction and permits portable use thereof, such as by dealers rebuilding tractor engines and the like.

The invention contemplates the determination of the position of the upper surface of the cylinder liner while pressure is being applied to the cylinder liner to provide an accurate determination of the cylinder liner projection in the serviced engine.

The measuring system utilizes a simple holddown bar, pressure plate, and press ring means in conjunction with a conventional dial indicator, providing facilitated portable means for effecting an accurate determination of the cylinder liner projection. By assuring the projecting of the cylinder liner to within desired tolerance limits, combustion gas leakage from the cylinder during operation of the engine is effectively prevented as proper sealing of the cylinder head to the cylinder block structure may be readily effected through the properly compressed sealing gaskets conventionally utilized.

As the measuring system is readily installed and removed relative to each of the cylinder liners, facilitated adjustment of the cylinder liner projections may be effected as by use of suitable simple shims as needed.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. The method of determining the amount of projection of a cylinder liner (14) received in a cylinder block bore (11) of a cylinder block structure (10) and having an upper end (15) extending to above a top surface (13) of the cylinder block structure, said method comprising the steps of:
   providing a pressure plate (25) having an accurately flat top surface (24) defining a reference plane;
   positioning the pressure plate against said top surface (13) of the cylinder block structure;
   urging the cylinder liner (14) fully about the circumferential extent thereof into fully inserted relationship in the cylinder block bore (11);
   providing a gage indicator (20) having a base (23) and a probe (22) extending downwardly from said base;
   positioning said indicator base (23) on said pressure plate top surface (24) to have the probe extend into engagement with said urged cylinder liner upper end (15) to provide a first reading from said reference plane; and
   positioning the indicator base (23) on said pressure plate top surface (24) to have said probe extend into engagement with said top surface (13) of the cylinder block structure to provide a second reading from said reference plane which when compared with said first reading indicates the amount of projection of said upper end beyond said top surface of the cylinder block structure.

2. The method of determining the amount of projection of a cylinder liner (14) of claim 1 wherein prior to extending the probe (22) into engagement with said cylinder liner upper end (15), said gage indicator (20) is adjusted to provide a zero scale reading with the probe (22) extended about the same amount as when brought into engagement with said cylinder liner upper end (15).

3. The method of determining the amount of projection of a cylinder liner (14) received in a cylinder block bore (11) and having an upper end (15) extending to above a top surface (13) of the cylinder block structure, said method comprising the steps of:
   providing a pressure plate (25) having accurately flat top and bottom surfaces (24,41), said top surface defining a reference plane;
   providing a gage indicator (20) having a base (23) and a probe (22) extending downwardly from said base;
   positioning the indicator base (23) on said pressure plate top surface (24) to have said probe extend into engagement with an element flush with said bottom surface (41) of the pressure plate (25) to provide a first reference reading from the reference plane defined by said top surface;
   positioning the pressure plate bottom surface (41) against said top surface (13) of the cylinder block structure (10);
   urging the cylinder liner (14) fully about its circumferential extent into fully inserted relationship in the cylinder block bore; and
   positioning said indicator base (23) on said pressure plate top surface (24) to have the probe extend into engagement with said urged cylinder liner upper end (15) to provide a second reading from said reference plane which when compared with said reference reading indicates the amount of projection of said upper end beyond said top surface of the cylinder block structure.

4. The method of determining the amount of projection of a cylinder liner of claim 3 wherein said gage indicator (20) is adjusted to provide zero scale reading when the probe is extended into engagement with said element.

5. The method of determining the amount of projection of a cylinder liner of claim 3 wherein said pressure plate (25) is provided with a through opening (40), said element is extended flush with said bottom surface across said opening, and said probe (22) is extended through said opening into engagement with said element in said first named positioning step.

6. The method of determining the amount of projection of a cylinder liner (14) of claims 1 or 3 wherein said upper end (15) of the cylinder liner defines a radially outwardly projecting flange (17), and said cylinder block structure (10) defines an upper, radially inwardly opening recess (44) receiving said flange, said step of urging the liner comprising a step of urging said flange against the bottom surface (45) of said recess.

7. The method of determining the amount of projection of a cylinder liner (14) of claims 1 or 3 wherein the top surface (13) of the cylinder block structure is defined by an upper deck element (12) and said step of positioning the pressure plate bottom surface comprises a step of positioning said surface against said upper deck element.

8. The method of determining the amount of projection of a cylinder liner (14) of claim 1 or 3 wherein said gage indicator (20) comprises a dial indicator (21) and said method includes a step of determining the indication of the dial indicator in making each of said readings.

9. The method of determining the amount of projection of a cylinder liner (14) of claims 1 or 3 wherein said step of urging the liner comprises a step of resiliently urging the liner (14).

10. The method of determining the amount of projection of a cylinder liner (14) of claims 1 or 3 wherein said step of urging the liner comprises a step of pressing a press ring (32) against the upper end surface (37) of the liner, and said probe (22) is extended through said press ring while it is pressing against said liner in providing said reference reading.

11. Measuring apparatus (19) for determining the projection of a cylinder liner (14) end for an engine block (10) in which the liner is mounted, said apparatus comprising:
   a pressure plate (25) having a top surface (24) defining a reference plane and a bottom surface (41);
   a gage indicator (20) having a base (23) and a probe (22) extending from said base;
   force transfer means (32) on said pressure plate for urging the cylinder liner into the engine block as an incident of said bottom surface (41) being urged against the engine block; and
   guide means (38,39,40) positioned on said pressure plate for passing said probe selectively (a) into engagement with said cylinder liner end (16) and (b) to a position flush with said bottom surface (41), with said base (23) seated on said pressure plate top surface for providing a measurement from said reference plane.

12. The measuring apparatus of claim 11 wherein said force transfer means comprises an element (32) carried by said pressure plate (25).

13. The measuring apparatus of claim 11 wherein said force transfer means comprises an element (32) resiliently carried by said pressure plate (25).

14. The measuring apparatus of claim 11 wherein said probe passing means comprises means (38,39,40) for passing said probe through said force transfer means.

15. The measuring apparatus of claim 11 wherein said force transfer means defines an annular flange (36) engaging said cylinder liner end (17) and said probe passing means comprises means (38,39,40) defining an opening (39) through said flange.

16. The measuring apparatus of claim 11 wherein said probe passing means comprises means (38,39,40) for passing said probe at a plurality of spaced positions through said force transfer means.

17. The measuring apparatus of claim 11 wherein said force transfer means comprises a press ring (32) resiliently carried by said pressure plate (25) and said press ring and pressure plate define aligned openings (38,39) for passing said probe therethrough into engagement with said cylinder liner end (15).

18. The measuring apparatus of claim 11 wherein said means for passing said probe comprises means (38) for passing said probe through said pressure plate (25) at a plurality of spaced positions.

19. The measuring apparatus of claim 11 wherein said pressure plate (25) defines a downwardly opening annular recess (31) and said force transfer means comprises a press ring 32 coaxially received in said recess.

20. The measuring apparatus of claim 11 wherein said pressure plate (25) defines a downwardly opening annular recess (31) and said force transfer means comprises a press ring 32 coaxially resiliently movably received in said recess.

21. The measuring apparatus of claim 11 wherein said pressure plate (25) defines a downwardly opening annular recess (31) and said force transfer means comprises a press ring (32) coaxially resiliently movably received in said recess, and means (33) for retaining said press ring (32) in association with said pressure plate (25).

* * * * *